US009311102B2

(12) United States Patent
Shah et al.

(10) Patent No.: US 9,311,102 B2
(45) Date of Patent: Apr. 12, 2016

(54) DYNAMIC CONTROL OF SIMDS

(75) Inventors: Tushar K. Shah, Orlando, FL (US);
Michael J. Mantor, Orlando, FL (US);
Brian Emberling, Palo Alto, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 13/180,721

(22) Filed: Jul. 12, 2011

(65) Prior Publication Data
US 2012/0013627 A1   Jan. 19, 2012

Related U.S. Application Data

(60) Provisional application No. 61/363,856, filed on Jul. 13, 2010.

(51) Int. Cl.
*G06F 9/38*   (2006.01)
*G06F 1/32*   (2006.01)
(Continued)

(52) U.S. Cl.
CPC ............ *G06F 9/3867* (2013.01); *G06F 1/3203* (2013.01); *G06F 1/3237* (2013.01);
(Continued)

(58) Field of Classification Search
CPC . G06F 1/3203; G06F 1/3237; G06F 9/30101; G06F 9/3842; G06F 9/3867; G06F 9/5094; G06T 15/005; Y02B 60/1221; Y02B 60/142
USPC .............. 345/501, 519, 522; 712/1, 220–222
See application file for complete search history.

(56) References Cited

U.S. PATENT DOCUMENTS 5,452,401 A    9/1995  Lin
7,594,095 B1 *  9/2009  Nordquist ....................... 712/22
(Continued)

FOREIGN PATENT DOCUMENTS

JP   H086681 A      1/1996
JP   2000047872 A   2/2000
(Continued)

OTHER PUBLICATIONS

F.J. Mesa-Martinez, M. Brown, J. Nayfach-Battilana, J. Renau, Measuring Power and Temperature from Real Processors, 2008, IEEE International Symposium on Parallel and Distributed Processing, Miami, FL. DOI: 10.1109/IPDPS.2008.4536423.*
(Continued)

*Primary Examiner* — Xiao Wu
*Assistant Examiner* — Michael J Cobb
(74) *Attorney, Agent, or Firm* — Volpe and Koenig, P.C.

(57) ABSTRACT

Systems and methods to improve performance in a graphics processing unit are described herein. Embodiments achieve power saving in a graphics processing unit by dynamically activating/deactivating individual SIMDs in a shader complex that comprises multiple SIMD units. On-the-fly dynamic disabling and enabling of individual SIMDs provides flexibility in achieving a required performance and power level for a given processing application. Embodiments of the invention also achieve dynamic medium grain clock gating of SIMDs in a shader complex. Embodiments reduce switching power by shutting down clock trees to unused logic by providing a clock on demand mechanism. In this way, embodiments enhance clock gating to save more switching power for the duration of time when SIMDs are idle (or assigned no work). Embodiments can also save leakage power by power gating SIMDs for a duration when SIMDs are idle for an extended period of time.

16 Claims, 14 Drawing Sheets

(51) Int. Cl.
  *G06F 9/30*   (2006.01)
  *G06T 15/00*  (2011.01)
  *G06F 9/50*   (2006.01)

(52) U.S. Cl.
  CPC .......... *G06F9/30101* (2013.01); *G06F 9/3842* (2013.01); *G06F 9/5094* (2013.01); *G06T 15/005* (2013.01); *Y02B 60/1221* (2013.01); *Y02B 60/142* (2013.01)

(56) References Cited

U.S. PATENT DOCUMENTS

| | | | | |
|---|---|---|---|---|
| 7,716,506 | B1* | 5/2010 | Surgutchik et al. | 713/321 |
| 2003/0229814 | A1* | 12/2003 | Garnett | 713/322 |
| 2005/0228967 | A1* | 10/2005 | Hirairi | 712/1 |
| 2006/0053189 | A1* | 3/2006 | Mantor | 708/490 |
| 2006/0080559 | A1* | 4/2006 | Sauber | 713/300 |
| 2006/0156042 | A1* | 7/2006 | Desai et al. | 713/300 |
| 2006/0282646 | A1* | 12/2006 | Dockser | 712/4 |
| 2007/0074054 | A1 | 3/2007 | Chieh | |
| 2007/0083699 | A1* | 4/2007 | Surico et al. | 711/103 |
| 2007/0101013 | A1* | 5/2007 | Howson | 709/231 |
| 2007/0234077 | A1 | 10/2007 | Rothman et al. | |
| 2007/0294558 | A1* | 12/2007 | Desai et al. | 713/340 |
| 2008/0041951 | A1* | 2/2008 | Adams et al. | 235/435 |
| 2008/0059966 | A1* | 3/2008 | Du et al. | 718/102 |
| 2008/0143730 | A1* | 6/2008 | Lindholm et al. | 345/501 |
| 2008/0189524 | A1* | 8/2008 | Poon et al. | 712/221 |
| 2008/0204460 | A1* | 8/2008 | Marinkovic et al. | 345/502 |
| 2008/0301792 | A1* | 12/2008 | Hong | 726/9 |
| 2008/0307240 | A1* | 12/2008 | Dahan et al. | 713/320 |
| 2009/0249094 | A1* | 10/2009 | Marshall et al. | 713/320 |
| 2009/0328055 | A1 | 12/2009 | Bose et al. | |
| 2010/0037038 | A1 | 2/2010 | Bieswanger et al. | |
| 2010/0094572 | A1* | 4/2010 | Chase et al. | 702/57 |
| 2010/0169680 | A1* | 7/2010 | Struik | 713/320 |
| 2010/0174923 | A1 | 7/2010 | Houlihan et al. | |
| 2011/0004575 | A1* | 1/2011 | Yang et al. | 713/300 |
| 2011/0018707 | A1* | 1/2011 | Dobson et al. | 340/539.13 |
| 2011/0173474 | A1* | 7/2011 | Salsbery et al. | 713/323 |
| 2011/0245981 | A1* | 10/2011 | Refai-Ahmed et al. | 700/282 |
| 2013/0339762 | A1* | 12/2013 | Bose et al. | 713/300 |

FOREIGN PATENT DOCUMENTS

| | | |
|---|---|---|
| JP | 2008299642 A | 12/2008 |
| WO | WO 2005/088443 A2 | 9/2005 |
| WO | WO 2009/091369 A1 | 7/2009 |
| WO | WO 2009/120427 A1 | 10/2009 |

OTHER PUBLICATIONS

Yan Luo, Jia Yu, Jun Yang, Laxmi Bhuyan, Low Power Network Processor Design Using Clock Gating, 2005, IEEE/ACM Design Automation Conference (DAC), Anaheim, California, retrieved from <<http://nepsim.cs.ucr.edu/nepsim/>>, accessed Oct. 26, 2015.*

Fung, Wilson W. L., et al., "Dynamic Warp Formation: Efficient MIMD Control Flow on SIMD Graphics Hardware," in *ACM Trans. Archit. Code Optim.* 6(2):1-37 (Jun. 1, 2009).

International Search Report and Written Opinion for International Application No. PCT/US2011/043509, European Patent Office, Netherlands, mailed on Jan. 31, 2012 (19 pages).

* cited by examiner

| CC_GC_SHADER_PIPE_CONFIG [R/W] | | | |
|---|---|---|---|
| DESCRIPTION: Configure shader pipe topology | | | |
| Field Name | Bits | Default | Description |
| INACTIVE_QD_PIPES | 15:8 | 0XFF | Bit-mask of which quad-pipes are inactive 0 = active; 1 = inactive QPs can be disabled a column at a time, not different SP's per SIMD |
| INACTIVE_SIMDS | 31:16 | 0XFFFF | Bit-mask of which SIMDs are inactive 0 = active; 1 = inactive |

FIG. 1B

RCU_CC_GC_SHADER_PIPE [R]

DESCRIPTION: Shadow copy of CC_GC_SHADER_PIPE_CONFIG

| Field Name | Bits | Default | Description |
|---|---|---|---|
| INACTIVE_QD_PIPES | 15:8 | 0X0 | Bit-mask of which quad-pipes are inactive<br>0 = active; 1 = inactive<br>QPs can be disabled a column at a time, not different SP's per SIMD |
| INACTIVE_SIMDS | 31:16 | 0X0 | Bit-mask of which SIMDs are inactive<br>0 = active; 1 = inactive |

RCU_CC_GC_SHADER_PIPE1 [R]

DESCRIPTION: Shadow copy of CC_GC_SHADER_PIPE_CONFIG

| Field Name | Bits | Default | Description |
|---|---|---|---|
| INACTIVE_QD_PIPES1 | 15:8 | 0X0 | Bit-mask of which quad-pipes are inactive<br>0 = active; 1 = inactive<br>QPs can be disabled a column at a time, not different SP's per SIMD |
| INACTIVE_SIMDS1 | 31:16 | 0X0 | Bit-mask of which SIMDs are inactive<br>0 = active; 1 = inactive |

FIG. 1C

GC_USER_SHADER_PIPE_CONFIG [R/W]
DESCRIPTION: Configure shader pipe topology

| Field Name | Bits | Default | Description |
|---|---|---|---|
| INACTIVE_QD_PIPES | 15:8 | 0X0 | Bit-mask of which quad-pipes are inactive<br>0 = active; 1 = inactive<br>QPs can be disabled a column at a time, not different SP's per SIMD |
| INACTIVE_SIMDS | 31:16 | 0X0 | Bit-mask of which SIMDs are inactive<br>0 = active; 1 = inactive |

FIG. 1D

| GC_USER_SHADER_PIPE_CONFIG [R/W] | | |
|---|---|---|
| DESCRIPTION: Configure shader pipe topology | | |
| Field Name | Bits | Default |
| INACTIVE_SIMDS | 31:16 | 0x0 |

| | Description |
|---|---|
| | Bit-mask of which SIMDs are inactive<br>0 = active; 1 = inactive |

| Bit [31] | Bit [30] | Bit [29] | Bit [28] | Bit [27] | Bit [26] | Bit [25] | Bit [24] | Bit [23] | Bit [22] | Bit [21] | Bit [20] | Bit [19] | Bit [18] | Bit [17] | Bit [16] |
|---|---|---|---|---|---|---|---|---|---|---|---|---|---|---|---|
| Res | Res | Res | Res | Res | Res | SIMD9 | SIMD8 | SIMD7 | SIMD6 | SIMD5 | SIMD4 | SIMD3 | SIMD2 | SIMD1 | SIMD0 |

FIG. 3A

| GRBM_GFX_INDEX [R/W] | | | |
|---|---|---|---|
| DESCRIPTION: Graphics Index Register | | | |
| Field Name | Bits | Default | Description |
| INSTANCE_INDEX | 7:0 | 0X0 | Which specific instance of a block will process reads/writes. Only valid for writes if INSTANCE_BROADCAST_WRITES=0 |
| SE_INDEX | 23:16 | 0X0 | Which specific shader engine (SE) will process reads/writes. Only valid for writes if SE_BROADCAST_WRITES=0 |
| INSTANCE_BROADCAST_WRITES | 30 | 0X1 | If enabled, then all instances will process the writes. |
| SE_BROADCAST_WRITES | 31 | 0X1 | If enabled, then all shader engines will process the writes. |

FIG. 3B

DYNAMIC CONTROL OF SIMDS

CROSS-REFERENCE TO RELATED APPLICATIONS

This patent application claims the benefit of U.S. Provisional Patent Application No. 61/363,856, filed Jul. 13, 2010, entitled "Dynamic Control of SIMDs," which is incorporated herein by reference in its entirety.

BACKGROUND

1. Field

Embodiments of the present invention generally relate to control of single instruction multiple data (SIMD) units in graphics processing units (GPUs).

2. Background Art

A math unit of a graphics processor includes arithmetic logical units (ALUs) or math units configured to perform integer, logical and single/double precision floating point operations.

Graphics processors can include an array of such math units, known as a shader core. A shader core includes a shader pipeline (SP). To achieve higher performance, multiple SPs can be configured to work together as stacked SPs. SPs can be structured as an array of quad pipes (QPs) and SIMDs. All shader units of each SIMD can conditionally execute an identical ALU instruction on different sets of primitive, vertex, or pixel values. In this way, SIMDs provide mathematical processing power to a graphics processor.

In conventional graphics processors having stacked SPs, SIMDs can be enabled or disabled statically. For example, if a SP was determined to be faulty, a fuse mask can be programmed to disable the faulty SP. Similarly a user accessible register can be programmed to disable/enable a specific SIMD or group of SIMDs. However, such methods require flushing of a graphics pipe of the graphics processor and reprogramming of new values into the flushed graphics pipe before sending new work requests to the SIMDs.

Furthermore, in conventional approaches, clocking of all SIMD units in a shader complex is either enabled or disabled simultaneously. In many applications, not all SIMDs are assigned work. However, conventional approaches continue to actively provide clocking signals to such SIMDs. This approach can increase power consumption of a graphics processor and is inefficient.

Accordingly, systems and methods are needed that enable dynamic control of SIMDs and reduce power consumption of a graphics processor when SIMDs may not be performing processing tasks.

BRIEF SUMMARY OF EMBODIMENTS OF THE INVENTION

Embodiments of the present invention enable power saving in a graphics processing unit by dynamically activating and deactivating individual SIMDs in a shader complex that comprises multiple SIMDs. On-the-fly dynamic disabling and enabling of individual SIMDs provides flexibility in achieving a required performance and power level for a given processing application. In this way, optimal usage of the graphics processing unit can be achieved.

Embodiments of the invention also achieve dynamic (also referred to here as dynamic medium grain) clock gating of SIMDs in a shader complex. Switching power is reduced by shutting down clock trees to unused logic by providing a clock on demand mechanism. In this way, clock gating is enhanced to save more switching power for the duration of time when SIMDs are idle (or assigned no work).

Embodiments of the present invention can be used in any computing system (e.g., a conventional computer (desktop, notebook, etc.) system, computing device, entertainment system, media system, game systems, communication device, personal digital assistant), or any system using one or more processors.

Embodiments of the present invention, for example, may be used processing systems having multi-core CPUs, GPUs, and/or GPGPUs, because code developed for one type of processor may be deployed on another type of processor with little or no additional effort. For example, code developed for execution on a GPU, also known as GPU kernels, can be deployed to be executed on a CPU, using embodiments of the present invention.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings:

FIGS. 1B-1D are registers that can be configured to control SIMDs, according to an embodiment.

FIGS. 3A-3B illustrate exemplary register settings for enabling and disabling SIMDs, according to an embodiment.

DETAILED DESCRIPTION OF EMBODIMENTS OF THE INVENTION

As discussed above, embodiments of the present invention enable power saving by dynamically activating and deactivating individual SIMDs in a shader complex.

Embodiments dynamically disable SIMDs for either reduced performance needs or to lower thermal design power (TDP) of a graphics processing unit. Furthermore, embodiments enable disabled SIMDs for high performance applications without having to flush a graphics pipe of the graphics processing unit. This is achieved by dynamically switching a number of SIMDs without flushing the SP. Dynamic control (or switching) is achieved, in part, by programming a set of registers appropriately.

In an embodiment, a shader pipe interpolator (SPI) assigns new work (or threads) based on registers that are configured dynamically to indicate which SIMDs are activated. In an embodiment, such dynamic configurations would take effect after current in-flight requests (or pending requests) are serviced by SIMDs that are to be disabled. Once disabled, no new requests from the SPI will go through to the disabled SIMDs and clocks of harvestable logic (e.g., sp4-vsp and texture clocks) are shut-off to reduce switching power of the graphics processing unit. When the disabled SIMDs are enabled, the SPI will again start allocating work to the enabled SIMDs providing higher performance of the graphics processing unit.

In an embodiment, activation and deactivation of the SIMDs and a number of SIMDs to be activated/deactivated is dependent on various factors such as operating conditions (e.g., temperature, current, CAC), applications (e.g., variable utilization to conserve energy), work load, or other requirements (e.g., performance needs, power needs).

Dynamic Control of SIMDs

Figure 1A:
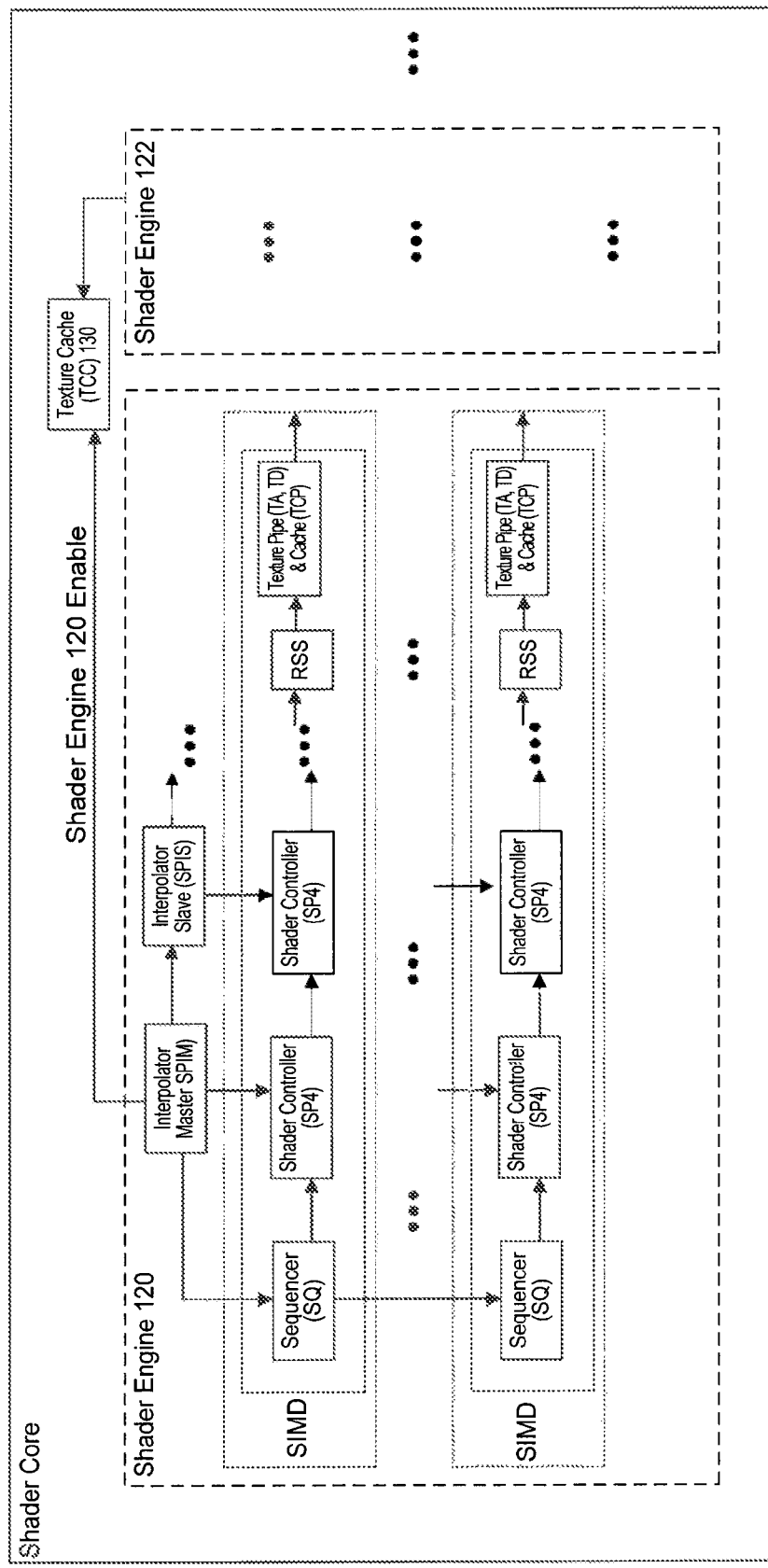
FIG. 1A illustrates a shader complex according to an embodiment.

FIG. 1A illustrates an exemplary shader complex 100, in which embodiments of the present invention are implemented. As discussed above, a shader complex can include a shader pipeline (SP). To achieve higher performance, multiple SPs can be configured to work together as stacked SPs. SPs can be structured as an array of quad pipes (QP) and SIMDs. All shader units of each SIMD can conditionally execute an identical ALU instruction on different sets of primitive, vertex, or pixel values. In an embodiment, shader complex 100 includes a plurality of SIMDs and two shader engines, namely, shader engine 120 and shader engine 122. Shader complex 100 also includes texture cache (TCC) 130 (or a level 2 texture cache), a plurality of shader pipe interpolators (SPIs) and vertex caches. Also included in shader complex 100 are a plurality of redundant shader switches (RSS), shader sequencers (SQ), level 1 texture caches (TCPs) and texture data logic (TD). (Although a lesser number of SIMDs are shown for clarity, it is to be appreciated that the invention is not limited to the illustrated embodiment and that shader complex 100 is scalable and can include any number of SIMDs.)

As discussed above, embodiments of the present invention dynamically switch a number of SIMDs without flushing the SP. Such dynamic control (or switching) is achieved, in part, by programming a set of registers appropriately. In an embodiment, an SPI assigns new work (or work threads) based on registers that are configured dynamically to indicate which SIMDs are activated.

The following section discusses exemplary registers that control the SIMD and QP masks.

FIG. 1B illustrates a register named as "CC_GC_SHADER_PIPE_CONFIG." In an embodiment, this register is programmed by a reset/configuration unit (RCU) based on fuse mask settings. As an example, this register can be programmed for harvesting purposes. This register has two fields; INACTIVE_QD_PIPES and INACTIVE_SIMDS. INACTIVE_QD_PIPES is a bit-mask that represents which quad-pipes are inactive. INACTIVE_SIMDS is a bit-mask that represents which SIMDs are inactive.

Similarly, "RCU_CG_GC_SHADER_PIPE" and the "RCU_CC_GC_SHADER_PIPE1" register illustrated in FIG. 1C, are shadowed versions of the "CC_GC_SHADER_PIPE_CONFIG" register. These registers are programmed based on a fuse mask or microcode. The RCU_CG_GC_SHADER_PIPE register has two fields: INACTIVE_QD_PIPES and INACTIVE_SIMDS. INACTIVE_QD_PIPES is a bit-mask that represents which quad-pipes are inactive. INACTIVE_SIMDS is a bit-mask that represents which SIMDS are inactive. Similarly, the RCU_CG_GC_SHADER_PIPE1 register has two fields; INACTIVE_QD_PIPES1 and INACTIVE_SIMDS1. INACTIVE_QD_PIPES1 is a bit-mask that represents which quad-pipes are inactive. INACTIVE_SIMDS1 is a bit-mask that represents which SIMDs are inactive.

The register "GC_USER_SHADER_PIPE_CONFIG," shown in FIG. 1D, is programmable by a user to limit a number of operating SIMDs (and/or QPs). This register can be memory mapped and shadowed by a shader engine per an index received from a graphics register bus manger (GRBM). This register has two fields: INACTIVE_QD_PIPES and INACTIVE_SIMDS. INACTIVE_QD_PIPES is a bit-mask that represents which quad-pipes are inactive. INACTIVE_SIMDS is a bit-mask that represents which SIMDs are inactive.

The register settings of "CC_GC_SHADER_PIPE_CONFIG" (FIG. 1B) are static in nature and are programmed once for a chip. In contrast, settings of the register "GC_USER_SHADER_PIPE_CONFIG" register can be programmed at any time dynamically (i.e., on-the-fly). Embodiments of the invention configure the "GC_USER_SHADER_PIPE_CONFIG" register for dynamic control of SIMDs.

In an embodiment, the resultant ORed value of "CC_GC_SHADER_PIPE_CONFIG" register and the "GC_USER_SHADER_PIPE_CONFIG" register is used by the SPI to determine (on the fly) enabled SIMDs to whom new threads (work) are to be assigned. In an embodiment, all other design blocks in the graphics pipe make use of the "CC_GC_SHADER_PIPE_CONFIG" register to statically disable themselves for inactive SIMDs/QPs. In an embodiment, such design blocks need not review the "GC_USER_SHADER_PIPE_CONFIG" register when such an operation causes an undesirable 'freezing' of the shader pipeline.

Figure 2:
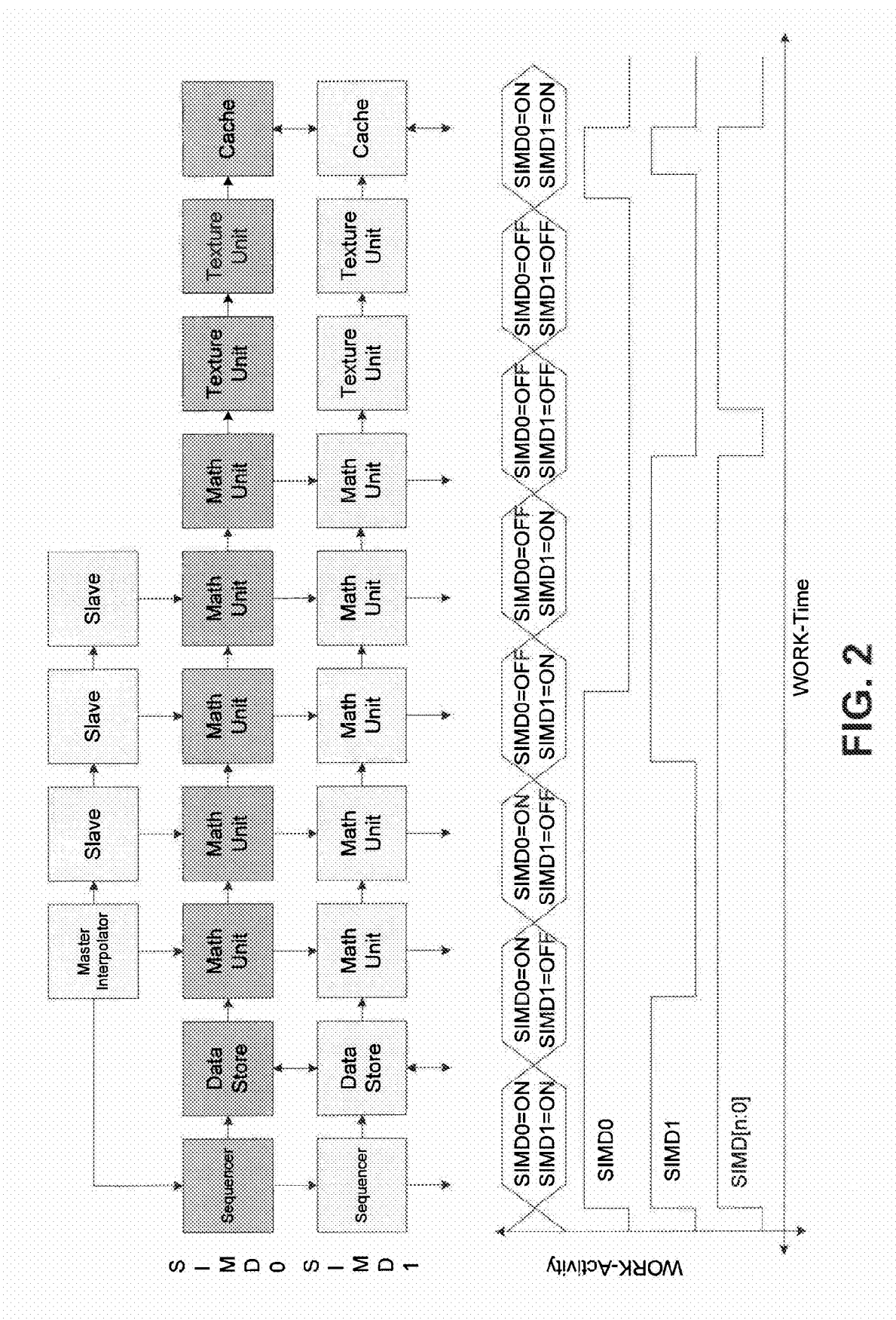
FIG. 2 illustrates an exemplary timing diagram, according to an embodiment.

Referring to the exemplary timing diagrams illustrated in FIG. 2, control of SIMDs can be achieved independent of activity in a shader engine. Even if a particular SIMD is busy executing instructions, embodiments can disable that SIMD during its active execution period. For example, referring to FIG. 2, SIMD0 can be disabled during its active execution period.

In an embodiment, not intended to limit the invention, the SPI does not assign work to a disabled (or de-activated) SIMD until the disabled SIMD is re-enabled. The disabled SIMD naturally drains work threads on completion of current work in it and pending work in a sequencer pipe. Once empty, medium grain clock gating (described further below) can disable clock signals to logic in the disabled SIMD. On re-enabling of a disabled SIMD, the SPI again starts submitting new threads (work requests) to the enabled SIMD. SIMD control settings are programmed through GRBM register writes and can be dynamically set by a driver or microcode.

From a system design perspective, SIMDs can be enabled or disabled at any time (i.e., on the fly). From a power savings perspective, a time of switch over from a SIMD enabled to SIMD disabled state can depend on workload pending in the SIMD pipe. The time needed to enable a disabled SIMD (or vice versa) is as fast as writing a GRBM register when an SPI is ready to allocate threads to that SIMD. As an example, for both cases, the time needed can be only a few clock cycles i.e., a few nano-seconds.

Exemplary Scenarios of Operation

The following are exemplary operational scenarios where embodiments of the invention and dynamic control of SIMDs are used.

A. Condition Based Control

Dynamic control of SIMDs can be condition dependent. Such exemplary conditions include, but are not limited to:

(1) Temperature Trip: When external sources indicate a higher processor temperature and there is a need for reduction in power consumption (or boost when applicable).

(2) Current Trip: When external sources indicate a higher processor current and there is a need for reduction in power consumption (or boost when applicable).

(3) CAC Management: When an on-chip CAC manager notices increased processing activity and makes a decision to increase performance by enabling more SIMDs or when the on-chip CAC manager notices decreased activity and makes a decision to reduce power by disabling a number of SIMDs without reduction in performance.

B. Application Based Control

Dynamic control of SIMDs can also be application dependent. Such exemplary applications include those that allow variable utilization to conserve energy. For example, a detected change in user mode of application from more processor intensive application (e.g., 3D graphics processing) to a less intensive application (e.g., DVD playback) can be used for dynamic control of SIMDs, according to the embodiments. User and application input through, for example, user interface (UI) input mechanisms or application programming interfaces (APIs) may also be employed to provide dynamic control of SIMDs. These input mechanisms can be used to set the required power level for a processing application or to achieve optimal performance/watt for the hardware. Such input mechanisms can be enabled through software (e.g., applications or operating systems), firmware, hardware or various combinations thereof.

C. Work Load Based Control

Dynamic control of SIMDs can be work load dependent. By way of example, dynamic control of SIMDs can be triggered based on one or more of the non-limiting exemplary GPU conditions listed below.
  (1) Static screen condition (No Load) (<5% of TDP)
  (2) Idle condition (very Light Load) (<10% of TDP)
  (3) Medium load condition (<50% of TDP)
  (4) Heavy load condition (<90% of TDP)
    (a) ALU bound
    (b) Texture fetch bound
    (c) Memory throughput bound
  (5) Very heavy load condition (>90% of TDP)

D. Requirement Based Control

Dynamic control of SIMDs can be requirement dependent and based on performance needs as well as power needs. A driver monitors GPU TDP and on approaching maximal TDP loads, disables SIMDs to reduce TDP. Such disabling of SIMDs can be accomplished with our without GPU frequency and voltage tuning.

The above exemplary control conditions can be detected and implemented using a driver and/or microcode. Embodiments can also allow controls dedicated to self-controlling the number of enabled SIMDs.

Exemplary Register Settings for Enabling and Disabling SIMDs

In any of the above mentioned conditional modes (or any other scenarios), a driver can write to bit fields (e.g., bit fields [31:16]) of register "GC_USER_SHADER_PIPE_CONFIG" to disable and enable SIMDs. As shown in FIG. 3A, writing "0" enables the SIMD and writing "1" disables the SIMD.

A graphics processing unit can include two or more shader engines (e.g., SE0 and SE1). In this scenario, embodiments can enable and disable different SIMDs for these shader engines. This can be achieved by programming the shader engines separately using a GRBM index register as illustrated in FIG. 3B.

Referring to FIG. 3B, (1) To write to "GC_USER_SHADER_PIPE_CONFIG" of SE0 (i.e., shader engine 0), the following exemplary instructions can be used:

```
mmGRBM_GFX_INDEX = 0x40000000    //point to SE0
mmGC_USER_SHADER_PIPE_CONFIG = 0xFF000000  //disable
//SIMD8 and SIMD9
mmGRBM_GFX_INDEX = 0xC0000000    //restore the GRBM index
//register to default
```

(2) To write to "GC_USER_SHADER_PIPE_CONFIG" of SE0 (i.e., shader engine 0), the following exemplary instructions can be used:

```
mmGRBM_GFX_INDEX = 0x40010000           //point to SE1
mmGC_USER_SHADER_PIPE_CONFIG = 0xFC030000 //disable
//SIMD1 and SIMD0
mmGRBM_GFX_INDEX = 0xC0000000           //restore the GRBM
index register to default
```

(3) To write to "GC_USER_SHADER_PIPE_CONFIG" of both SE0 and SE1 (i.e., shader engine 1), the following exemplary instructions can be used:

```
mmGC_USER_SHADER_PIPE_CONFIG = 0xFC0C0000
//disable SIMD3 & SIMD2 of both SE0 and SE1
```

SIMDs enabled per shader engine (e.g., SE0, SE1, etc.) can be changed on the fly, as long as at least one SIMD is left enabled for each shader engine in each subset to which work is being applied. In other words, for example, if SIMDs are partitioned for different types of work, i.e., two SIMDs per side for tessellation shaders, and the remaining SIMDs shared between vertex and pixel work, one of the two SIMDs for tessellation shaders can be left enabled, and one of the remaining SIMDs for pixel and vertex enabled.

Figure 3C:
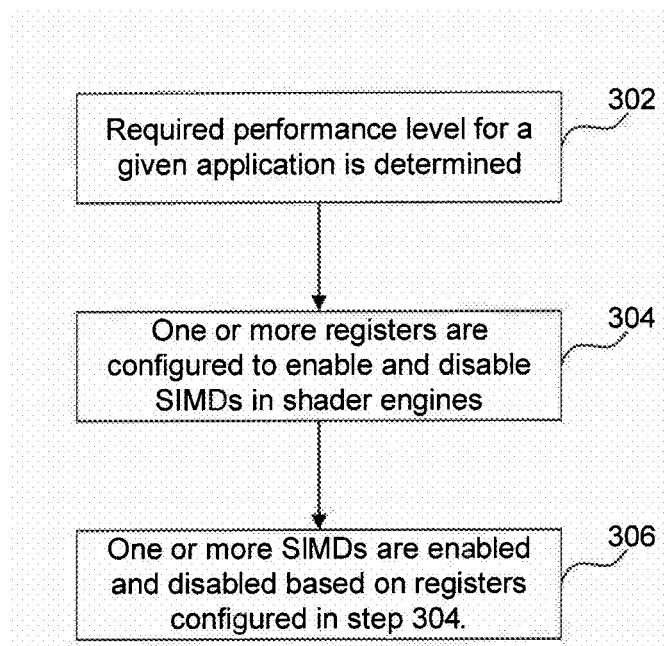
FIG. 3C is a flowchart illustrating an exemplary operation, according to an embodiment.

FIG. 3C is a flowchart illustrating an exemplary overall operation, according to an embodiment.

In step 302, a required performance level for a given processing operation is determined. As an example, such a performance level can be application, condition, workload or requirement dependent.

In step 304, one or more registers are configured to enable and disable different SIMDs in shader engines. As an example, such a configuration can be achieved by programming the shader engines separately using a GRBM index register as illustrated in FIG. 3B.

In step 306, one or more registers are enabled or disabled based on the registers configured in step 304.

The following section illustrates exemplary plots that can aid embodiments in making tradeoff decisions between performance and power savings.

Power Savings Vs Performance Impact

When a SIMD is enabled, it consumes power. With increased processing activity, the SIMD would consume even more power. Conversely, with less activity, the SIMD would consume less power. In an idle state, the SIMD would consume minimal but a measurable amount of power based on the size of the SIMD (e.g., area, cell count etc).

Figure 4A:
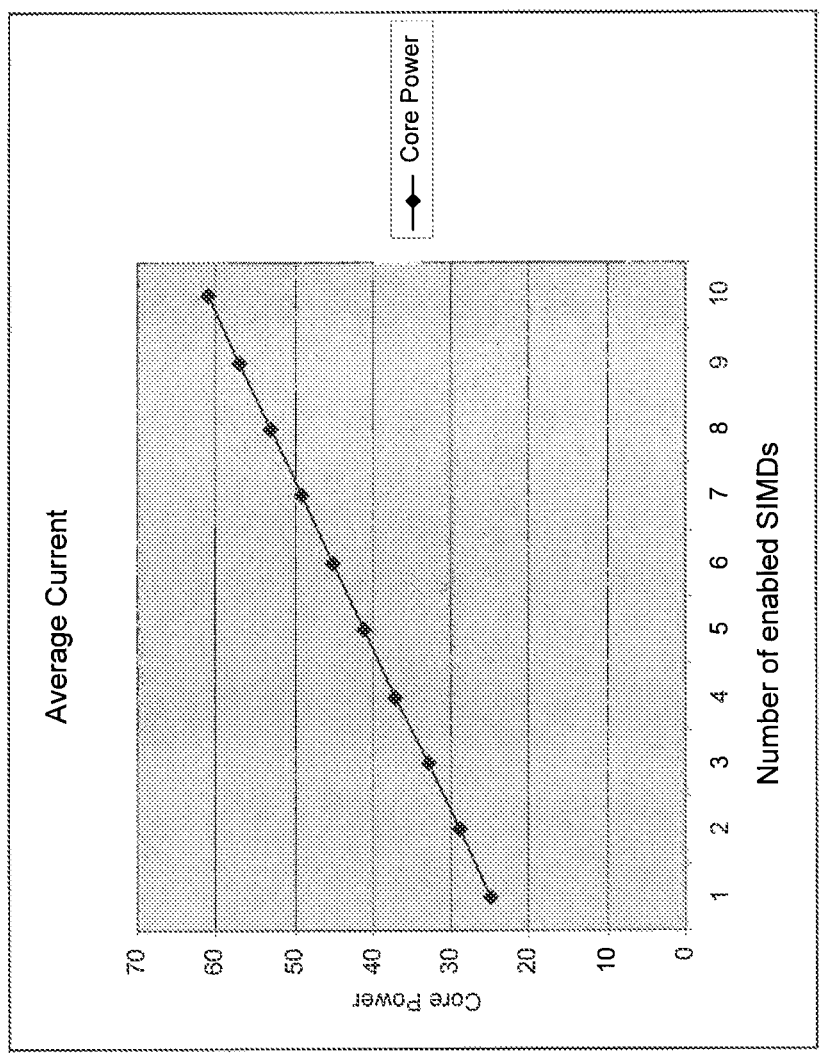
FIGS. 4A-4F illustrate exemplary performance plots, according to embodiments.

The plot of FIG. 4A shows a linear increase in core power with an increase in the number of enabled SIMDs. The plot depicts a scenario where an application is SIMD bound. In other words, the application is a power intensive application that consumes all available SIMD resources.

A general assumption is that performance of a graphics processing unit would increase with an increase in a number of SIMDs. However, this statement can generally be true for intensive processing tasks. In several scenarios, depending on load conditions, conventional approaches may waste power as they keep all SIMDs enabled even with light processing loads. An example of SIMD load balancing is described in the application entitled "Method and System for Load Optimization for Power" Ser. No. 12/839,962, which is incorporated herein by reference as though set forth in its entirety.

The following sections discuss exemplary SIMD performance per watt plots for different types of applications.

(1) Application with an Ideal Load

Figure 4B:
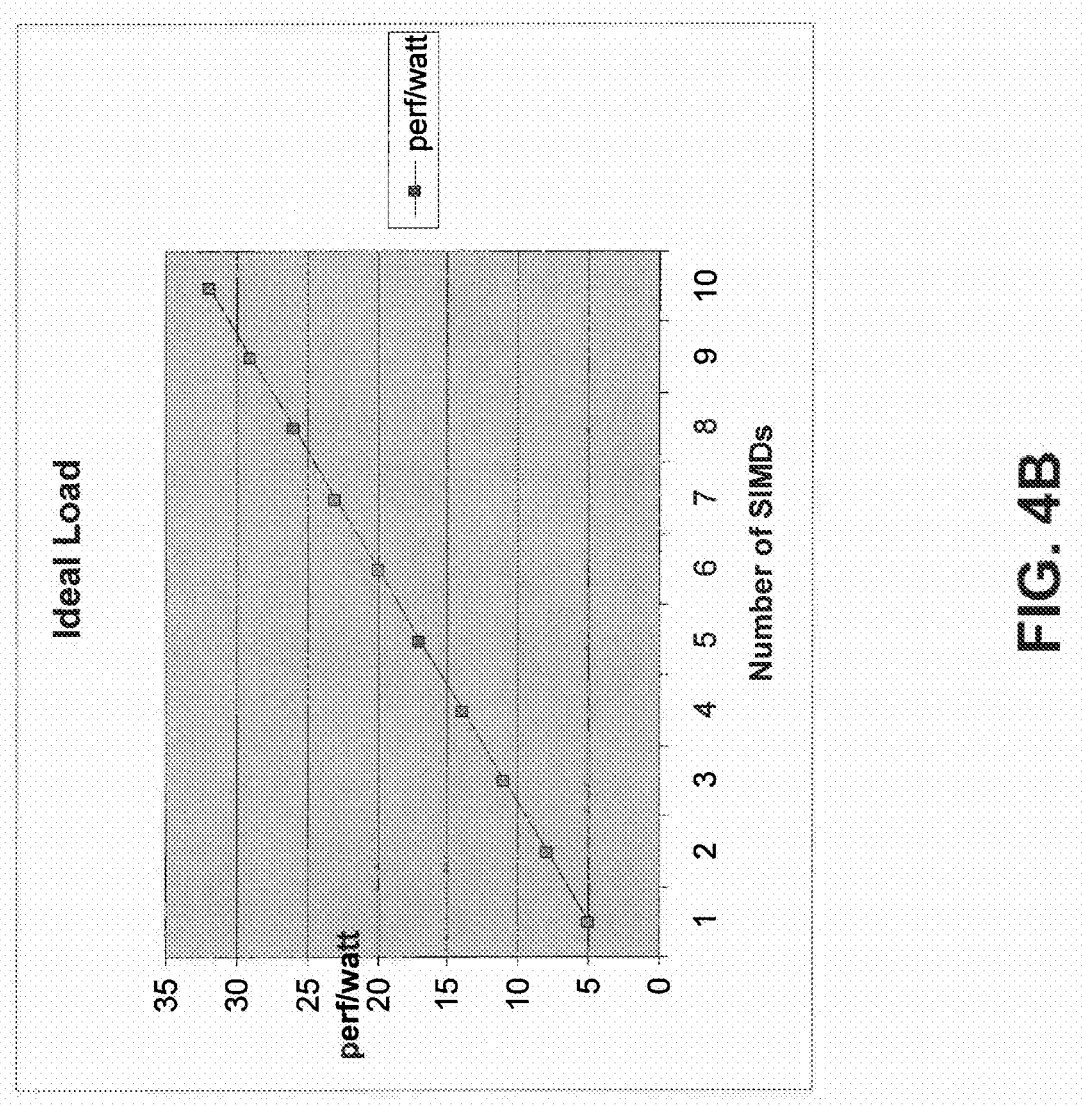

FIG. 4B illustrates a performance per watt plot for an application with an ideal load. As shown in FIG. 4B, as the number of SIMDs increase, the performance per watt of the graphics processing unit increases linearly with constant power consumption per SIMD.

(2) Application with a Balanced Load

Figure 4C:
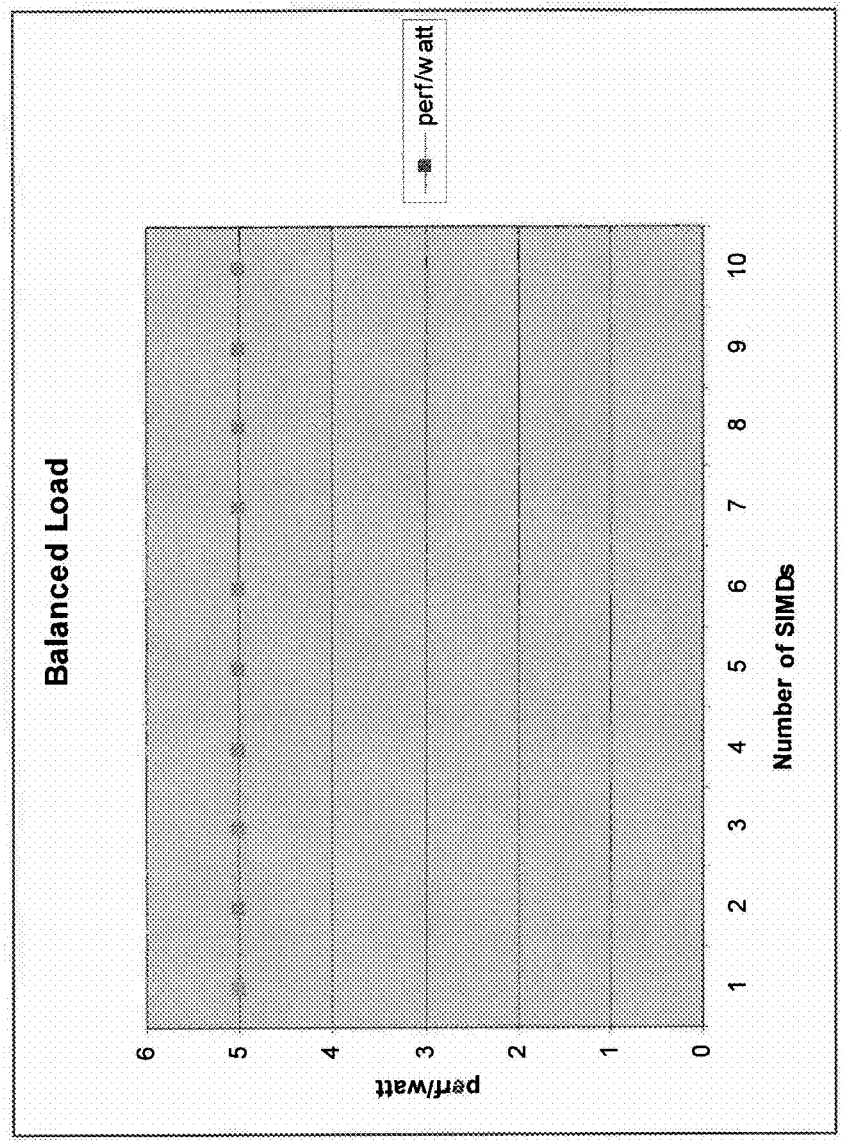

FIG. 4C illustrates a performance per watt plot for an application with a balanced load. As shown in FIG. 4C, as the number of SIMDs increases, performance per watt is sustained.

(3) Application with Realistic Loads

Figure 4D:
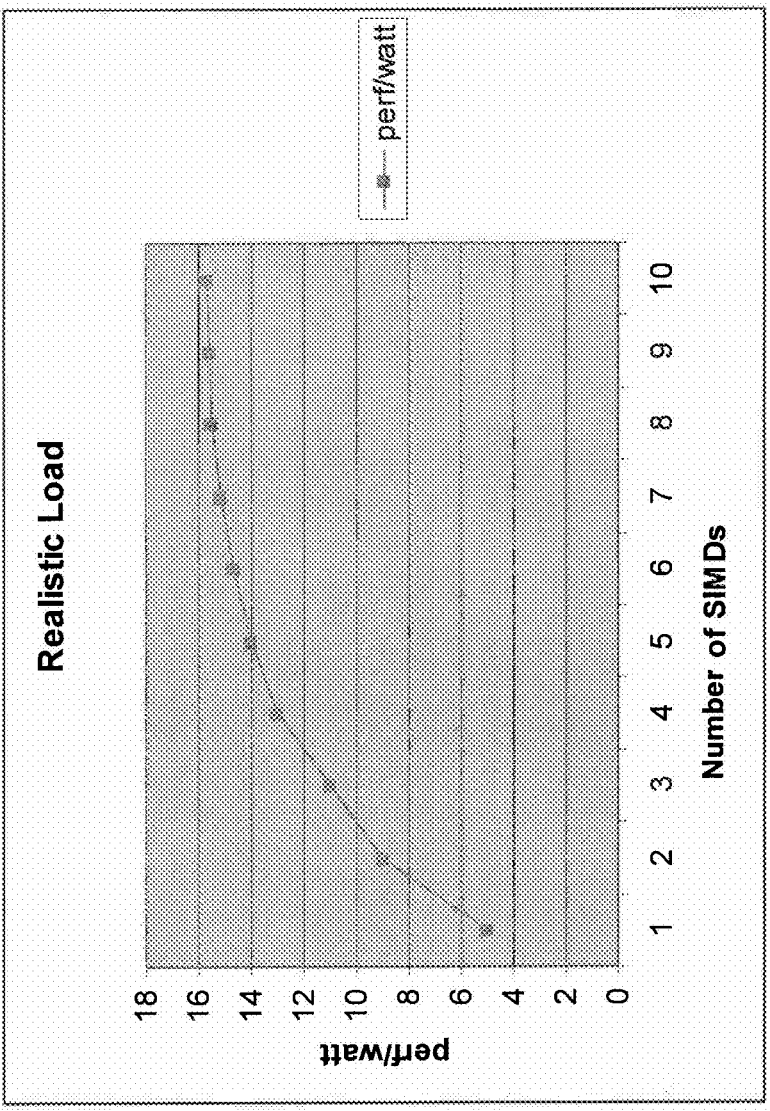
Figure 4E:
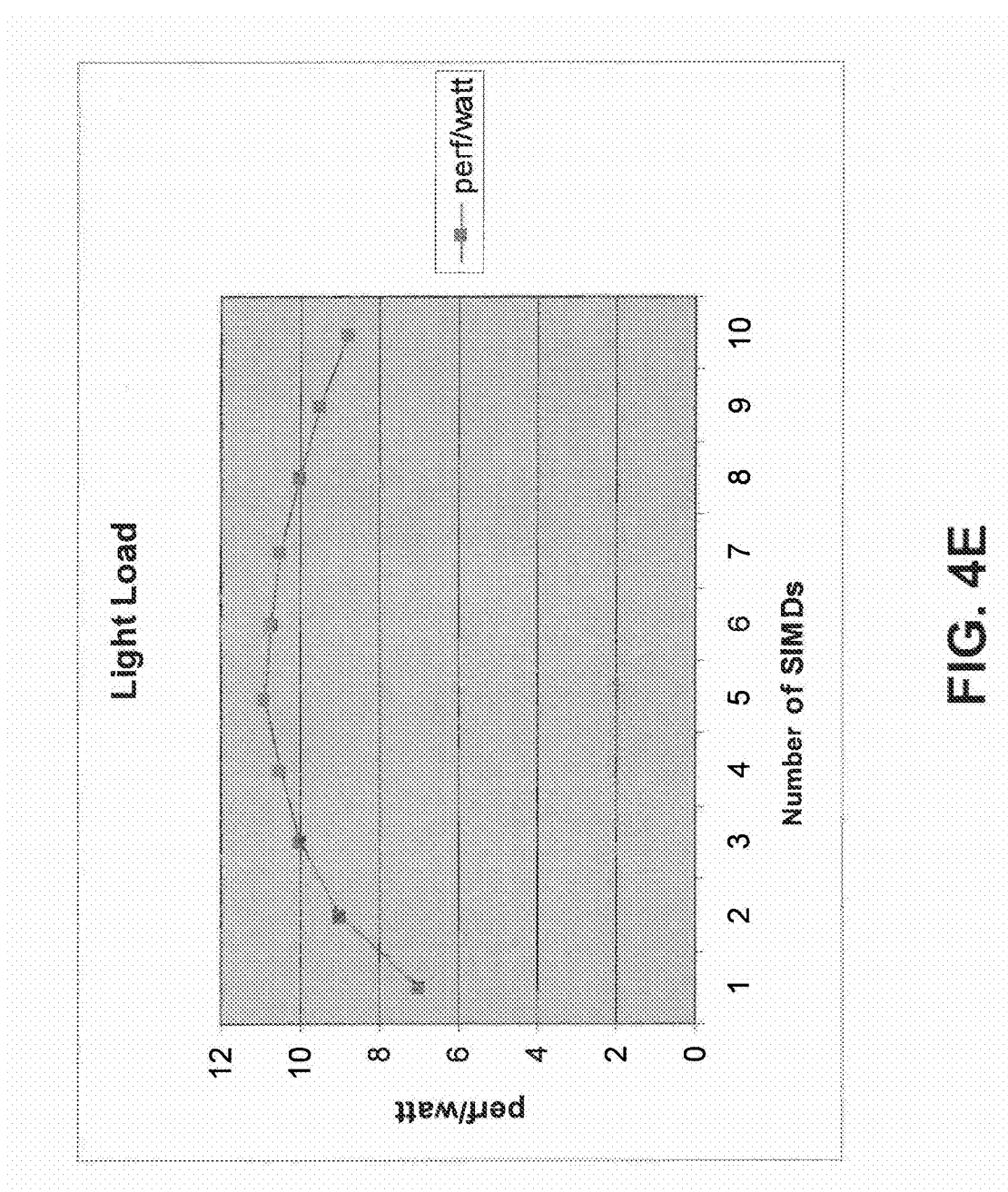
Figure 4F:
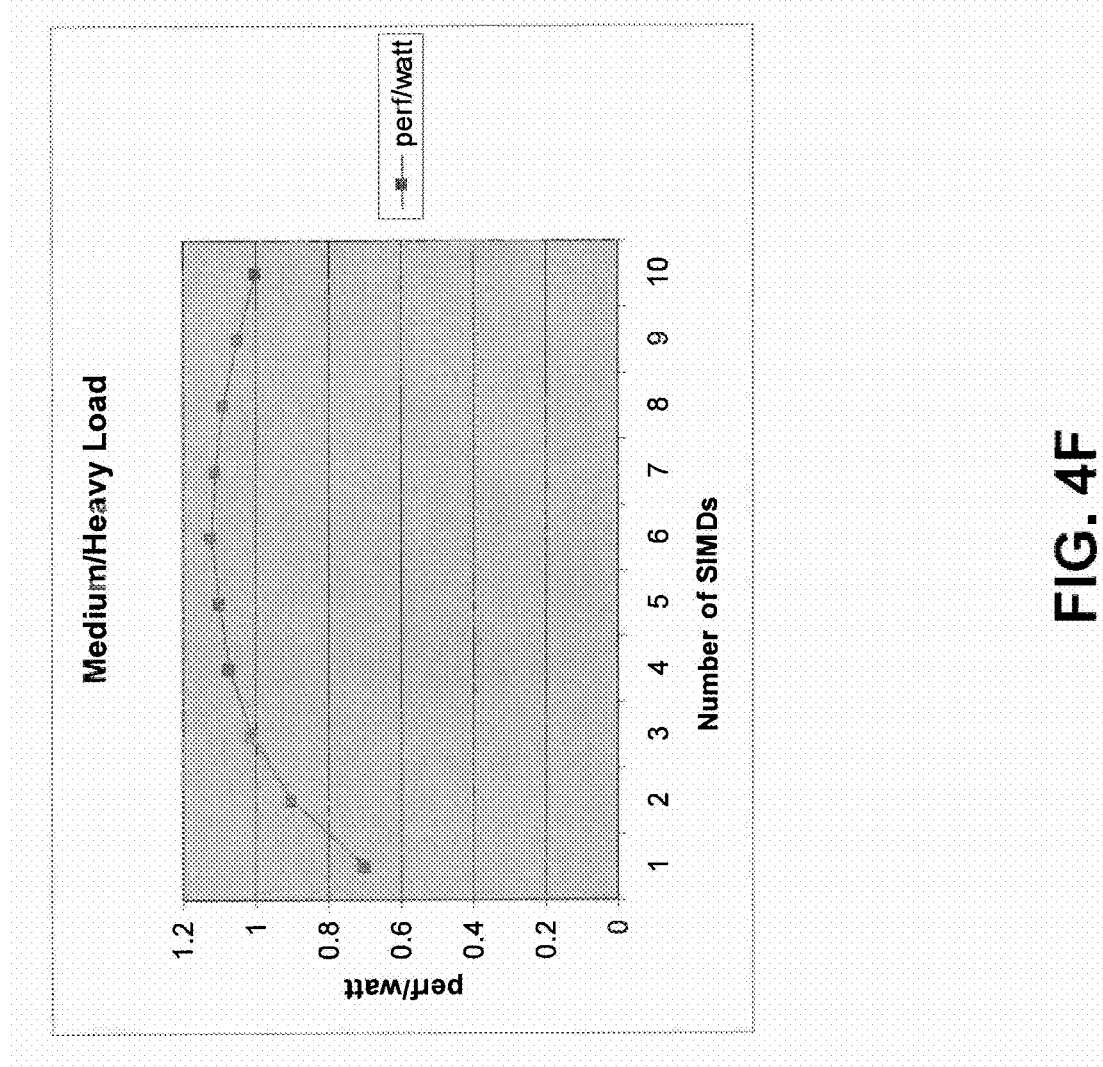

Often, in realistic scenarios, processing loads are such that performance per watt characteristics lie in between the characteristics for an ideal load and characteristics for a balanced load. As shown in FIG. 4D, with increase in SIMDs, performance per watt increases at first but later saturates and either remains at a constant level or may even reduce. When performance per watt reduces, more power is consumed at a relatively lower performance gain. This can be seen from the light and medium/heavy load plots shown in FIGS. 4E and 4F respectively.

Savings for Each Mode of Operations

As can be seen from plots in FIGS. 4A-4F, power savings in accordance with the embodiments would vary from application to application. In many applications, for example, embodiments save power without compromising performance. Such applications include DVD playback applications where SIMD processing load can be light.

As a purely illustrative non-limiting example, on an AMD R770 processor with "eclk=875 MHz" and "mclk=900 MHz," a per SIMD power consumption is approximately 4.5 watts with heavy loads. With lighter loads, the power consumption would reduce due to clock gating and dynamic SIMD control, in accordance with the embodiments. For example, if it is required to clamp power to certain level then reducing the number of SIMDs at heavy loads would yield significant savings. In an embodiment, applications can also determine a number of SIMDs that are enabled or disabled in a graphics processing unit.

Dynamic Medium Grain Clock Gating

As discussed above, in conventional approaches, clocking of all SIMD units in a shader complex is either enabled or disabled simultaneously. In many applications, not all SIMDs are assigned work. However, conventional approaches continue to actively provide clocking signals to such SIMDs. This approach increases power consumption of a graphics processing unit and is inefficient. Conventional approaches can include static clock gating for shader complex blocks in which, when a request is initiated by a SPI, clocks of shader complex blocks are turned-on, one by one, with a di/dt (i.e., rate of change of current) avoidance count delay. Once started, the clocks keep clocking for the entire shader complex even if there is no work for many blocks inside the shader complex. In other words, only a few SIMDs are active at any given time. Once work is completed by the shader complex, the clocks are shut-off automatically using the di/dt avoidance count delay. Thus, in conventional approaches, clock gating is static in nature, and treats the shader complex as a single system.

In contrast to conventional approaches, embodiments of the invention achieve dynamic grain (e.g., dynamic medium grain) clock gating of individual SIMDs in a shader complex. Switching power is reduced by shutting down clock trees to unused logic, and by providing a clock on demand mechanism (e.g., a true clock on demand mechanism). In this way, clock gating can be enhanced to save switching power for a duration of time when SIMDs are idle (or assigned no work).

Embodiments of the present invention also include dynamic control of clocks to each SIMD in a shader complex. Each SIMD is treated as shader complex sub-system that manages its own clocks. Dynamic control for each block/tile in an SIMD is also provided. Clocking can start before actual work arrives at SIMDs and can stay enabled until all the work has been completed by the SIMDs.

Dynamic medium grain clock gating, according to the embodiments, causes negligible performance impact to the graphics processing unit. Embodiments of the present invention can also be used to control power of SIMDs by power gating switches and thus save leakage power of SIMDs.

Various aspects of the embodiments of the invention can be implemented by software, firmware, hardware (or hardware represented by software such as, for example, Verilog or hardware description language instructions), or a combination thereof. FIG. 1A is an illustration of an example computer system in which the present invention, or portions thereof, can be implemented as computer-readable code. It should be noted that the simulation, synthesis and/or manufacture of the various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer usable medium including a semiconductor, magnetic disk, optical disk (such as CDROM, DVD-ROM) and as a computer data signal embodied in a computer usable (e.g., readable) transmission medium (such as a carrier wave or any other medium such as, for example, digital, optical, or analog-based medium). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for use in a graphics processing unit (GPU) comprising:
   determining a condition related to the power consumption of the GPU, wherein the condition is based on any one or a combination of temperature, current, and processor activity;
   programming a configuration register to disable one or more single instruction multiple data (SIMD) units in a shader pipeline in response to the determined condition;
   dynamically disabling the one or more SIMD units in the shader pipeline based on the determined condition, wherein the dynamically disabling the one or more SIMD units includes providing dynamic medium grain clock gating to the one or more SIMD units and dynamic control of one or more clocks to each SIMD unit; and
   assigning one or more work threads to the one or more active SIMD units in the shader pipeline, wherein the work threads are assigned to one or more active SIMD units without having to flush the shader pipeline.

2. The method of claim 1, wherein the dynamically disabling comprises disabling the one or more SIMD units during an active execution period and independent of activity in a shader engine associated with the one or more SIMD units.

3. The method of claim 1, further comprising:
   disabling a dispatch of one or more work threads to the one or more disabled SIMD units; and
   determining when one or more pending work threads in the one or more disabled SIMD units are cleared.

4. The method of claim 1, further comprising: setting one or more bit indices of the configuration register based on one or more of a processing work load, an application requirement, and the one or more operating conditions.

5. The method of claim 1, wherein the dynamically disabling further comprises disabling one or more clock trees to unused logic in the one or more SIMD units.

6. The method of claim 1, further comprising: determining a power level for a processing application.

7. The method of claim 6, further comprising: determining a number of the one or more SIMD units to execute the processing application.

8. The method of claim 1, wherein the configuration register includes one or more bit indices that are set based on a logical operation performed between one or more bit indices of a user programmable setting register and one or more corresponding bit indices of a fuse mask setting register.

9. The method of claim 1, wherein the dynamically disabling further comprises clock gating the one or more SIMD units for a duration of time that the one or more SIMD units are idle.

10. The method of claim 1, further comprising: clock gating the one or more disabled SIMD units after the one or more disabled SIMD units drain a pending work thread.

11. A system comprising:
   a graphics processing unit (GPU) configured to determine a condition related to the power consumption of the GPU, wherein the condition is based on any one or a combination of temperature, current, and processor activity;
   the GPU further configured to program a configuration register to disable one or more single instruction multiple data (SIMD) units in a shader pipeline in response to the determined condition;
   the GPU further configured to dynamically disable the one or more SIMD units in the shader pipeline based on the determined condition, wherein the dynamically disabling the one or more SIMD units includes providing dynamic medium grain clock gating to the one or more SIMD units and dynamic control of one or more clocks to each SIMD unit; and
   the GPU is further configured to assign one or more work threads to the one or more active SIMD units in the shader pipeline, wherein the work threads are assigned to one or more active SIMD units without having to flush the shader pipeline.

12. The system of claim 11, wherein the GPU is further configured to disable the one or more SIMD units during an active execution period and independent of activity in a shader engine associated with the one or more SIMD units.

13. The system of claim 11, wherein the GPU is further configured to determine a required power level for a processing application.

14. A non-transitory computer-readable medium that stores instructions adapted to be executed by a processor to:
   determine a condition related to the power consumption of the GPU, wherein the condition is based on any one or a combination of temperature, current, and processor activity;
   program a configuration register to disable one or more single instruction multiple data (SIMD) units in a shader pipeline in response to the determined condition;
   dynamically disable the one or more SIMD units in the shader pipeline based on the determined condition, wherein the dynamically disabling the one or more SIMD units includes providing dynamic medium grain clock gating to the one or more SIMD units and dynamic control of one or more clocks to each SIMD unit; and
   assign one or more work threads to one or more active SIMD units in the shader pipeline, wherein the work threads are assigned to the one or more active SIMD units without having to flush the shader pipeline.

15. The non-transitory computer-readable medium of claim 14, further comprising instructions adapted to be executed by the processor to: determine a required power level for a processing application.

16. The non-transitory computer-readable medium of claim 15, further comprising instructions adapted to be executed by the processor to: determine a number of the one or more SIMD units to execute the processing application.

* * * * *